US012759230B2

(12) United States Patent
Langboim et al.

(10) Patent No.: US 12,759,230 B2

(45) Date of Patent: Oct. 13, 2026

(54) PRINTING 3D-OBJECTS BY INKJET

(71) Applicant: Kornit Digital Ltd., Rosh HaAyin (IL)

(72) Inventors: Lahav Langboim, Rehovot (IL); Jacob Mann, Zoran (IL)

(73) Assignee: Kornit Digital Ltd., Rosh HaAyin (IL)

( * ) Notice: Subject to any disclaimer, the term of this patent is extended or adjusted under 35 U.S.C. 154(b) by 368 days.

(21) Appl. No.: 18/269,772

(22) PCT Filed: Dec. 22, 2021

(86) PCT No.: PCT/IL2021/051525

§ 371 (c)(1),
(2) Date: Jun. 27, 2023

(87) PCT Pub. No.: WO2022/144873

PCT Pub. Date: Jul. 7, 2022

(65) Prior Publication Data

US 2024/0316862 A1 Sep. 26, 2024

Related U.S. Application Data

(60) Provisional application No. 63/131,343, filed on Dec. 29, 2020.

(51) Int. Cl.
*B29C 64/194* (2017.01)
*B29C 64/112* (2017.01)
(Continued)

(52) U.S. Cl.
CPC .......... *B29C 64/194* (2017.08); *B29C 64/112* (2017.08); *B29C 64/245* (2017.08);
(Continued)

(58) Field of Classification Search
None
See application file for complete search history.

(56) References Cited

U.S. PATENT DOCUMENTS

| | | | | |
|---|---|---|---|---|
| 2010/0215865 A1* | 8/2010 | Keoshkerian | ........... | B41C 1/003 427/511 |
| 2012/0282448 A1* | 11/2012 | Chretien | ................ | C09D 11/34 264/401 |

(Continued)

FOREIGN PATENT DOCUMENTS

| | | |
|---|---|---|
| CN | 101876787 | 11/2010 |
| EP | 2223803 | 9/2010 |

(Continued)

OTHER PUBLICATIONS

International Preliminary Report on Patentability Dated Jul. 13, 2023 From the International Bureau of WIPO Re. Application No. PCT/IL2021/051525 (9 Pages).

(Continued)

*Primary Examiner* — Alexander M Weddle

(57) ABSTRACT

Provided herein is a process for forming a 3D object on a substrate using liquid inkjet compositions, machinery and methodologies, devoid of dry powders or UV-curable agents. The 3D object is digitally printed according to the additive approach, by inkjet printing a top layer over a base layer before curing the base layer, whereas a layer is formed as a gel, and the gelatinous object is thereafter cured.

14 Claims, 6 Drawing Sheets

(51) Int. Cl.

| | |
|---|---|
| ***B29C 64/245*** | (2017.01) |
| ***B29K 33/00*** | (2006.01) |
| ***B29K 105/00*** | (2006.01) |
| ***B29K 105/08*** | (2006.01) |
| ***B29K 201/00*** | (2006.01) |
| ***B29K 267/00*** | (2006.01) |
| ***B33Y 10/00*** | (2015.01) |
| ***B33Y 30/00*** | (2015.01) |
| ***B33Y 40/00*** | (2020.01) |
| ***B33Y 80/00*** | (2015.01) |

(52) U.S. Cl.

CPC ............... *B33Y 10/00* (2014.12); *B33Y 30/00* (2014.12); *B33Y 40/00* (2014.12); *B33Y 80/00* (2014.12); *B29K 2033/00* (2013.01); *B29K 2105/0061* (2013.01); *B29K 2105/0809* (2013.01); *B29K 2201/00* (2013.01); *B29K 2267/003* (2013.01)

(56) References Cited

U.S. PATENT DOCUMENTS

| | | | | |
|---|---|---|---|---|
| 2015/0151487 | A1 | 6/2015 | Lcighton | |
| 2016/0244628 | A1* | 8/2016 | Breton | C09D 11/12 |
| 2017/0106586 | A1 | 4/2017 | Kcoshkcrian et al. | |
| 2017/0121547 | A1 | 5/2017 | Chopra et al. | |
| 2020/0055302 | A1 | 2/2020 | Varanasi et al. | |

FOREIGN PATENT DOCUMENTS

| | | | |
|---|---|---|---|
| EP | 3909913 | | 11/2021 |
| JP | 2006130864 A | * | 5/2006 |
| WO | WO 2022/144873 | | 7/2022 |

OTHER PUBLICATIONS

International Search Report and the Written Opinion Dated Apr. 24, 2022 From the International Searching Authority Re. Application No. PCT/IL2021/051525. (14 Pages).

Supplementary European Search Report and the European Search Opinion Dated Oct. 21, 2024 From the European Patent Office Re. Application No. 21914865.7. (9 Pages).

Notification of Office Action and Search report Dated Aug. 6, 2025 From the State Intellectual Property Office of the People's Republic of China Re. Application No. 202180090626.4 and Its Translation in English (10 Pages).

Notification of Office Action and Search Report Dated Mar. 28, 2026 From the State Intellectual Property Office of the People's Republic of China Re. Application No. 202180090626.4. with its Summary and Machine Translation Into English. (14 Pages).

* cited by examiner

PRINTING 3D-OBJECTS BY INKJET

RELATED APPLICATIONS

This application is a National Phase of PCT Patent Application No. PCT/IL2021/051525 having International filing date of Dec. 22, 2021, which claims the benefit of priority under 35 USC § 119 (e) of U.S. Provisional Patent Application No. 63/131,343, filed on Dec. 29, 2020. The contents of the above applications are all incorporated by reference as if fully set forth herein in their entirety.

FIELD AND BACKGROUND OF THE INVENTION

The present invention, in some embodiments thereof, relates to 3D printing and more particularly, but not exclusively, to a method of printing 3D objects by inkjet standard methodologies, machinery and compositions.

The concept of inkjet printing was initially described in 1878 by Lord Rayleigh, and in 1951 Siemens patented the first 2D inkjet type printer called a Rayleigh breakup inkjet device. Since then 3D inkjet printing has been conceptualized and practiced, but remained mainly a powder-based method (a.k.a. the MIT method) where layers of solid particles typically 200 μm in height with particle sizes ranging between 50 and 100 μm are bound together by a printed liquid material to generate a 3D model. In powder-based techniques the first layer of powder is distributed evenly on the top of a support stage, e.g., by a roller after which an inkjet printer head prints droplets of liquid-binding material onto the powder layer at desired areas of solidification. After the first layer is completed, the stage drops and a second powder layer is distributed and selectively combined with printed binding material. These steps are repeated until a 3D model is generated after which the model is usually heat treated to enhance the binding of the powders at desired regions. Unbound powder serves as support material during the process and is removed after fabrication.

In the thermal phase change technique, a wax-like material, which is solid at room temperature, is melted and deposited by inkjet onto a substrate. The wax solidifies upon cooling, before a new layer of liquid wax is deposited. Support constructions are built in the same way as model construction layers and use the same material. The main disadvantages of this technique are the relatively poor surface quality, difficult support removal and the poor mechanical properties of the wax-like materials used.

In the PolyJet method the slices are formed, layer by layer, by a process of selective inkjet deposition of UV curable liquid compositions and immediate solidification by exposure to flood UV radiation. The support construction is built in the same way as the slices of the 3D object, but using a different material. The support material is generally a UV curable gel-like material which enables easy removal and leaves a well-defined and smooth object surface. Because PolyJet has proved to overcome many of the traditional disadvantages of existing 3D printing approaches, this method became the leading approach in 3D inkjet printing.

Although numerous improvements and different approaches have been developed over the years, only until a decade ago no systems enabling the building of objects using more than one modeling material at a time had been developed. In November 2007, Objet Geometries Ltd. from Israel disclosed a new technology breakthrough that enables the simultaneous use of two UV curable modeling materials for building complicated assemblies and structures. In addition, this new technology offers the possibility of building composite materials or digital materials, as they are termed by Objet Geometries Ltd.

U.S. Pat. No. 7,134,749 provides a method and an apparatus for color printing on a dark textile piece, the method includes the steps of digitally applying a white ink layer directly onto a textile piece, and digitally printing a colored image on said white ink layer before curing the white ink. The limitation of this technology, is its adequacy to synthetic fabrics dyed with dispersed dyes, wherein the dye migrates to the white underbase layer, and tints it at the image curing step.

U.S. Pat. No. 9,624,390 teaches a method of inkjet printing an image on a dyed synthetic textile substrate, which includes modifying a synthetic textile so as to exhibit negatively charged functional groups thereon so as to obtain a modified synthetic textile substrate; dying the modified synthetic textile substrate so as to obtain a dyed modified synthetic textile substrate; contacting at least a portion of a surface of the modified substrate with an immobilization composition which comprises an acid, to thereby obtain a wet portion of the modified substrate; inkjet printing a colored ink composition and/or an opaque white underbase ink composition directly on the wet portion, to thereby form the image; and curing the image. The limitation of this technology is the requirement to pre-treat the fabric, which adds to the processing time and cost, and may not be suitable for all synthetic fibers.

WIPO Patent Application WO/2018/138720 discloses an inkset designed for printing on dyed synthetic fabrics, which includes an immobilizing composition and at least one ink composition, the ink composition comprises a dispersed pigment and/or dye, a low-temperature curing self-cross-linking resin and an aqueous carrier, and formulated to exhibit an alkaline pH higher than 7, the immobilizing composition comprises an acid and an aqueous carrier, and formulated to exhibit an acidic pH lower than 7, the inkset is for digital inkjet printing color images directly on a dyed substrate, wherein the low-temperature curing self-cross-linking resin is a pH-sensitive low-temperature curing self-crosslinking resin that initiates the crosslinking reaction at a temperature that is lower than the typical curing temperature and ranges from 90° C. to 110° C. The limitation posed by this technology is the cost of such low-temperature curing self-crosslinking resin, and its adequacy for all synthetic fabrics even in low temperature curing of 100-110° C. may suffer from dye migration due to the quality or other properties of the fabric dyeing process, ink compositions and customer's demands.

Additional prior art documents include U.S. Pat. Nos. 4,575,330, 5,387,380, 5,733,497, 5,855,836, 6,569,373 and 7,300,619.

SUMMARY OF THE INVENTION

The present invention provides a solution to the problem associated with the liquidity and critical properties of inkjet compositions used in digital inkjet printing, which prevented the use of such compositions and techniques to for 3D objects. As known in the art, inkjet compositions must comply with certain rheological requirements, which are detrimental for additive approaches in 3D object printing, however, the present invention teaches the harnessing of these same properties to form intricate high resolution 3D objects on any substrate, including uneven and absorptive surfaces such as fabrics, by using two-part jellification reaction to form each layer of the emerging object while the layers are still wet and uncured. Each layer is formed by inkjet printing a layer-forming composition and a jellification composition, whereas the layer-forming composition congeals upon contacting the jellification composition on the substrate (or the previous layer). The 3D object is formed by adding layer after layer while all layers are still wet (uncured), and finally curing the object by heat.

Thus, according to an aspect of some embodiments of the present invention, there is provided a process of printing or otherwise forming a three-dimensional solid object on a surface of a substrate, that is effected by:

(a) inkjet printing a pattern on an area of the surface using a layer-forming composition and a jellification composition, thereby forming a first gelatinous layer;
(b) repeating step (a) on the first gelatinous layer, thereby forming a second gelatinous layer on the first gelatinous layer;
(c) repeating step (b) n-times so as to form an $n^{th}$ gelatinous layer on the second gelatinous layer, thereby forming a three-dimensional gelatinous object wherein n is an integer equal or greater than 1, and
(d) curing the three-dimensional gelatinous object, thereby forming the three-dimensional object.

According to some embodiments of the present invention, the thickness/height of each of the first, second and $n^{th}$ gelatinous layer independently is at least 10 μm.

According to some embodiments of the present invention, the spatial resolution of discernable structural features in the three-dimensional gelatinous object is at least 0.1 mm.

According to some embodiments of the present invention, n is greater than 2, or greater than 4.

According to some embodiments of the present invention, each of the layer-forming composition and the jellification composition is essentially devoid of a UV-curable agent.

According to some embodiments of the present invention, the layer-forming composition comprises a pigment.

According to some embodiments of the present invention, the pigment is opaque.

According to some embodiments of the present invention, the concentration of the opaque pigment ranges 1-40 wt %.

According to some embodiments of the present invention, the pigment is translucent.

According to some embodiments of the present invention, the concentration of the translucent pigment ranges 2-30 wt %.

According to some embodiments of the present invention, the layer-forming composition includes a gelling agent that congeals at a pH of less than 7 or upon contacting a cation or upon contacting a metal oxide.

According to some embodiments of the present invention, the gelling agent is selected from the group consisting of a pH-sensitive alkali-soluble polymer selected from the group consisting of a polyacrylate, a polyurethane, a polyester, a polybutadiene, a polyvinylchloride, a polyvinyl alcohol, a polyvinyl acetate, a polyimine, and any mixture and/or copolymers thereof.

According to some embodiments of the present invention, the concentration of the gelling agent in the layer-forming composition ranges 0.1-30 wt %.

According to some embodiments of the present invention, the layer-forming composition further includes a non-coagulating film-forming agent at a concentration that ranges 0-30 wt %.

According to some embodiments of the present invention, the gelling agent and/or the non-coagulating film-forming agent when present are selected such that a standalone cured 1 mm thick film formed from a layer-forming composition that includes the same exhibits an elongation factor of at least 5%.

According to some embodiments of the present invention, the viscosity of the layer-forming composition ranges 4-25 cps at 25° C.

According to some embodiments of the present invention, the maximal dispersed particle size in the layer-forming composition ranges less than 5 μm.

According to some embodiments of the present invention, the layer-forming composition is printed at a drop size that ranges 10-120 pl.

According to some embodiments of the present invention, the jellification composition comprises a gelling initiator selected from the group consisting of an acid, a divalent cation and a metal oxide.

10 According to some embodiments of the present invention, the concentration of the gelling initiator in the jellification composition ranges 0.1-20 wt %.

According to some embodiments of the present invention, the gelling initiator is a transitory acid, and the pH of the jellification composition ranges 3-6.5.

According to some embodiments of the present invention, the layer-forming composition is applied before, together or after applying the jellification composition.

According to some embodiments of the present invention, the process is effected on an absorptive substrate is with respect to each of the layer-forming composition and the jellification composition, and the process further includes applying a base jelling composition on the surface of the substrate, prior to Step (a).

According to some embodiments of the present invention, the base jelling composition is applied at an amount that ranges 5-50 mg/cm$^2$.

According to some embodiments of the present invention, Step (d) of the process is effected by heating the three-dimensional gelatinous object to a temperature ranging 90-200° C.

According to some embodiments of the present invention, the process is essentially devoid of a photo-initiated, propagated and/or any UV light-effected curing.

According to another aspect of some embodiments of the present invention, there is provided a substrate having the three-dimensional (3D) object on its surface, obtained by the process provided herein.

According to some embodiments of the present invention, the three-dimensional object is stretchable to at least 5% longitudinal elongation before breaking or detaching from the surface.

According to some embodiments of the present invention, the height of the three-dimensional object (Z-axis) is at least 30 μm, 40 μm, 50 μm or at least 60 μm.

According to some embodiments of the present invention, the substrate used in the process provided herein is selected from the group consisting of absorptive material, a non-absorptive material, a flexible material, and a stretchable material.

According to some embodiments of the present invention, the absorptive material is a fabric.

According to some embodiments of the present invention, the three-dimensional object is essentially devoid of stratification marks thereon or therein.

According to some embodiments of the present invention, the three-dimensional object comprises at least one discernable stratum.

According to another aspect of some embodiments of the present invention, there is provided a three-dimensional object, obtained by the process of the present invention and further obtainable by separating the object from the substrate.

According to some embodiments of the present invention, the object exhibits a height of at least 50 μm.

According to some embodiments of the present invention, the three-dimensional object is stretchable to at least 5% longitudinal elongation before breaking.

According to some embodiments of the present invention, the object is essentially devoid of stratification marks thereon or therein.

According to some embodiments of the present invention, the object includes at least one discernable stratum.

According to another aspect of some embodiments of the present invention, there is provided a three-dimensional gelatinous object, comprising at least three layers of a jellified layer-forming composition.

According to some embodiments of the present invention, the layer-forming composition in the gelatinous object is jellified by contacting a jellification composition.

According to some embodiments of the present invention, at least one of the layers in the gelatinous object is characterized by at least one property that is different than the property of at least one of the other layers.

According to some embodiments of the present invention, the property is color.

According to some embodiments of the present invention, the gelatinous object is in contact with a surface of a substrate.

According to another aspect of some embodiments of the present invention, there is provided a three-dimensional solid object, comprising at least three layers of a cured layer-forming composition.

According to some embodiments of the present invention, at least one of the layers in the solid object is characterized by at least one property different than the property of the other layers.

According to some embodiments of the present invention, the property is color.

According to some embodiments of the present invention, the solid object is in contact with a surface of a substrate.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying figures. With specific reference now to the figures in detail, it is stressed that the particulars shown are by way of example and for purposes of illustrative discussion of embodiments of the invention. In this regard, the description taken with the figures makes apparent to those skilled in the art how embodiments of the invention may be practiced.

In the figures:

FIGS. 1A-D present schematic illustrations of the steps in the process provided herein, according to some embodiments of the present invention, wherein FIG. 1A shows the step after forming first gelatinous layer 11, FIG. 1B shows the step after the formation of second gelatinous layer 12, FIG. 1C shows the 3D gelatinous object after printing $n^{th}$ gelatinous layer 13 and additional layers 14-16, and FIG. 1D shows solid object 17 on the substrate after the curing step;

FIG. 4A), a cotton garment (an absorptive substrate; FIG. 4B), and the same pattern and substrate as in FIG. 4B, but without printing a jelling composition with or between the layers (FIG. 4C);

DESCRIPTION OF SOME SPECIFIC EMBODIMENTS OF THE INVENTION

Figure 1A:
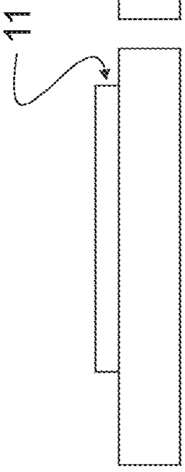

The present invention, in some embodiments thereof, relates to 3D printing and more particularly, but not exclusively, to a method of printing 3D objects by inkjet standard methodologies, machinery and compositions.

The principles and operation of the present invention may be better understood with reference to the figures and accompanying descriptions.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

A long-felt need of the fashion industry is a method for 3D relief printing on fabrics with high resolution and acceptable fastness. The problem associated with 3D printing using digital inkjet printing arise from the combination of surface absorption and ink composition rheological requirements-whereas the latter is detrimental for additive 3D printing approach unless each and every layer is solidified before the next layer can be applied thereon.

While conceiving the present invention, the inventors have contemplated an intermediate stage of instant semi-solidification (jellification) of the layers, which will allow the entire object to be formed before the final solidification curing takes effect, thereby ridding the process of the time-consuming and energy-inefficient requirement to solidify each layer at a time, while preventing structural collapse (Z-axis), pattern feature coalescence (X/Y-axes) and maintaining a high resolution continuous 3D object.

While two layers of a coagulating ink have been practiced prevalently, the successful stratification of more than 2 layers of wet jellified ink was surprising, and more so was the ability to produce 3D objects more than 12 layers tall and at high spatial resolution, by inkjet methodologies.

An Inkjet Process for Printing a 3D Object:

Thus, according to some aspects of the present disclosure, there is provided a process of forming a three-dimensional (3D) object on a surface of a substrate. In the context of the present invention, a final 3D object is a solid object, which may exhibit a range of mechanical properties, such as elasticity, fragility, texture, as well as color, shape, and size, depending on the printing compositions and the printed pattern.

In some embodiments, the process is effected step-wise by:

(a) inkjet printing a pattern on an area of the surface using a layer-forming composition and a jellification composition, thereby forming a first gelatinous layer;

(b) repeating step (a) on the first gelatinous layer, thereby forming a second gelatinous layer on the first gelatinous layer;

(c) repeating step (b) n-times so as to form the $n^{th}$ gelatinous layer on top of the previous (second) gelatinous layer, thereby forming a three-dimensional gelatinous object, wherein n is an integer equal or greater than 1, and (d) curing the three-dimensional gelatinous object, thereby forming the three-dimensional object.

Figure 1B:
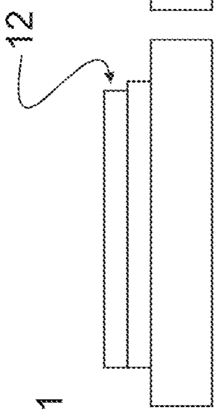
Figure 1C:
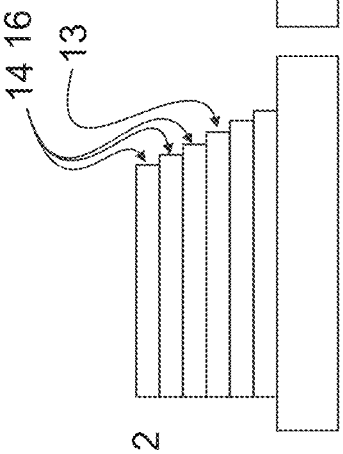
Figure 1D:
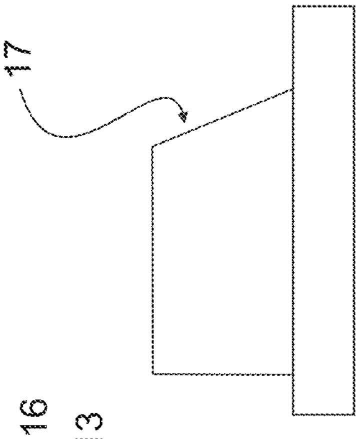

FIGS. 1A-D present schematic illustrations of the steps in the process provided herein, according to some embodiments of the present invention, wherein FIG. 1A shows the step after forming first gelatinous layer 11, FIG. 1B shows the step after the formation of second gelatinous layer 12, FIG. 1C shows the 3D gelatinous object after printing $n^{th}$ gelatinous layer 13 and additional layers 14-16, and FIG. 1D shows solid object 17 on the substrate after the curing step.

The term "gelatinous", as used herein, is an adjective referring to the consistency, texture, and general mechanical properties of a substance. A gelatinous substance is semi-solid, having a jelly-like consistency and/or viscosity. In the context of the present invention, the term gelatinous is used to refer to the pre-cured/uncured object that is being printed, that is different that the cured object, which is a hard or elastic solid, but not a gel.

According to some embodiments of the present invention, the layer-forming composition is applied/printed before, together or after applying the jellification composition. In some embodiments, particularly when using an absorptive substrate, the first step of the process may be the application of a base jelling composition prior to the application of the layer-forming composition, in order to mitigate absorption/soaking/bleeding/wicking, and to smoothen the uneven surface of some substrates. The base jelling composition is essentially similar and sometimes identical to the jellification composition, whereas the first is referred to herein as "FIXA" and the latter as "FOF" (for more details, see below)

An inkjet printing process is characterized by high resolution, stemming from the ability to eject very small droplets by an accurately and reproducibly positioned printhead. This high resolution trait of 2D inkjet printing is surprisingly reproduced and applicable for the presently disclosed process in 3D. According to some embodiments.

In the context of embodiments of the present invention, the resolution of the resulting 3D object corresponds to the resolution of the printed pattern of each layer. The limits of the resolution of the object's structural features stem from the undesired tendency of adjacent gelatinous (semi-liquid/solid) features of the pattern to come in contact and coalesce. One criteria for defining the spatial resolution of structural features in the 3D object printed by the process, according to embodiments of the present invention, is the minimal distance between adjacent features at the base on the object, namely the smallest distance between two discernable features in the first layer that can be printed on the substrate without coalescing, as depicted in FIG. 2.

Figure 2:
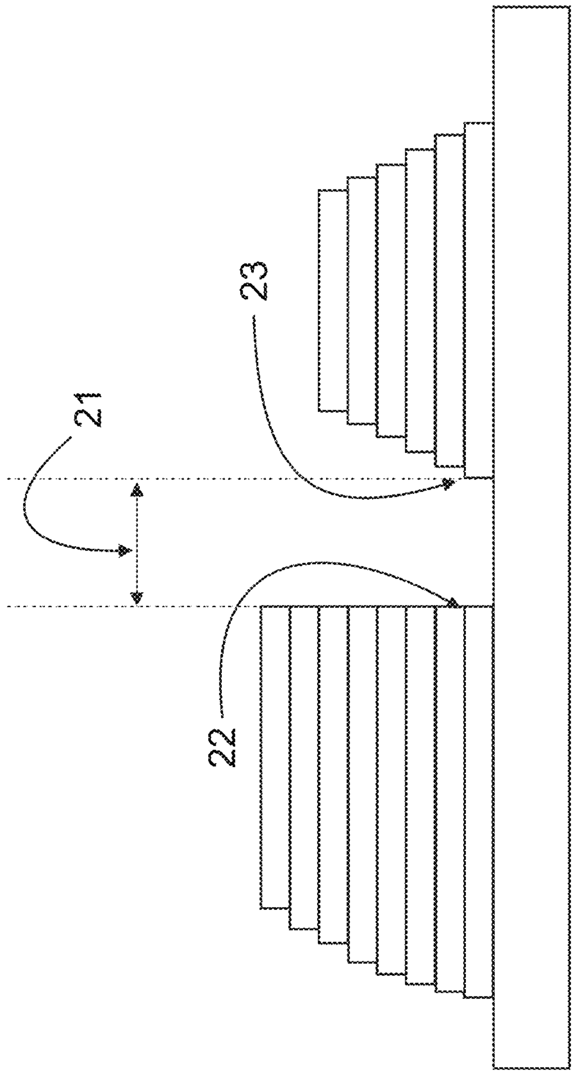
FIG. 2 presents a schematic illustration of the value used to define the resolution by which a 3D object can be formed, according to embodiments of the present invention, wherein distance 21 defines the object's spatial resolution (dc) as the minimal distance between gelatinous structural feature 22 and gelatinous structural feature 23 achievable without coalescing.

FIG. 2 presents a schematic illustration of the value used to define the resolution by which a 3D object can be formed, according to embodiments of the present invention, wherein distance 21 defines the object's spatial resolution ($de_c$) as the minimal distance between gelatinous structural feature 22 and gelatinous structural feature 23 achievable without coalescing.

According to some embodiments, the spatial resolution ($d_c$) of discernable structural features characterizing the process of 3D printing, according to embodiments of the present invention, is at least 0.1 mm. This value may depend on factors other than the printing machine and the printed composition, such as the type of material, the temperature and stillness of the printing environment, which also affects the properties of the gelatinous structural features, and therefore the minimal distance between such features prior to solidification by curing.

One of the surprising discoveries made by the present inventors while reducing the present invention to practice, was the number of layers that can be printed, one over the other, while all layers are still not cured (still wet), and without having the gelatinous structure (gelatinous 3D object) collapse. Hence, in some embodiments, n (the number of layers beyond the first and second layers) is greater than 1, or greater than 2, 3, 4, 5, 6, 7, 8, 9, 10, 15, 20, 25, 30, 40, or greater than 50 wet layers prior to curing.

The process provided herein differs fundamentally from known inkjet-based 3D printing methodologies, in which each layer is cured, typically by UV radiation, prior to placing the next layer thereupon; the presently disclosed process is different in that the object is fully formed from all layers prior to curing the object, while all layers are still gelatinous (wet). Notwithstanding the aforementioned, the present invention is not limited in the mean of curing the gelatinous 3D object, namely the gelatinous 3D object may be formed as described, and the curing can be effected by, e.g., UV radiation, provided that a UV-curable agent is part of the layer-forming composition.

In some embodiments of the present invention, each of the layer-forming composition and the jellification composition is essentially devoid of a UV-curable agent. In some embodiments of the present invention, the process is essentially devoid of a photo-initiated, propagated and/or otherwise light-effected curing.

In some embodiments of the present invention, curing ("step (d)") is effected by heating the three-dimensional gelatinous object to a temperature ranging 90-200° C. or 140-180° C., or to about 160° C. In some embodiments in which the layer-forming composition includes a low-temperature curing crosslinking agent, the curing step may be effected at temperatures lower than 120° C., or lower than 100° C.

Layer-Forming Composition:

In general, the layer-forming composition, according to embodiments of the present invention, is an aqueous suspension/emulsion/solution that complies with all the requirements of an inkjet ink composition in terms of rheology, viscosity, particle size, conductivity, reactivity/inertness, and stability, as these are known in the art. According to some embodiments of the present invention, a composition that cannot be jetted from an inkjet printhead, as the term "inkjet printhead" is known in the art, due to any of the abovementioned requirements, is excluded from the scope encompassed by the term "layer-forming composition". For example, compositions that include dry powder, which forms a layer in some additive 3D-printing methodologies, and/or compositions that do not exhibit appropriate viscosity (too thick or too thin) for being jetted from an inkjet printhead, are not encompassed by the term "layer-forming composition".

For example, in some embodiments of the present invention, the viscosity of the layer-forming composition ranges 4-25 cps or 4-20 cps, and/or the maximal dispersed particle size in the layer-forming composition is up to 5 μm.

In some embodiments, the layer-forming composition is an inkjet ink composition, in the sense that is comprises all the elements of an inkjet ink composition in terms of ingredients and properties. As such, a layer-forming composition may include any one or more of a colorant, a resin, a humectants, a co-solvent, a surfactant, a defoamer, a rheology modifier, a biocide/fungicide and a carrier/solvent (i.e., water).

Alternatively, the layer-forming composition is a colorless, substantially transparent composition that forms a colorless, substantially transparent layer of substance in the final 3D object.

The layer-forming composition comprises one or more ingredients that form a film upon curing, e.g., film-forming agents. The term "film-forming agent" is used herein in its industry-used meaning. The film that is formed from the film-forming agent(s) in the layer-forming composition corresponds to a single layer, or stratum, in the final 3D object. Film-forming agents constitute a group of substances that leave a pliable, cohesive, and continuous covering/coating over a substrate when applied to its surface. Non-limiting examples of substances that can act as film-forming agents in the context of embodiment of the present invention, include (poly) acrylates, (poly) urethanes, (poly) acrylamides, polyvinylpyrrolidone (PVP), polysiloxane and copolymers thereof.

When formulating a layer-forming composition, one may select the film-forming agents in the composition according to their light-interaction properties, such as transparency/opaqueness/turbidity, refraction, reflectance, absorbance, luminescence, phosphorescence, fluorescence, and the likes.

When formulating a layer-forming composition, one may select the film-forming agents in the composition according to desired mechanical properties of the resulting film, which will impact the mechanical properties of the 3D object. Thus, the layer-forming composition may be defined inter alia by the mechanical properties of a standalone cured film afforded therefrom. For example, the layer-forming composition is defined by an elongation factor of at least 5%, 10%, 20%, 30%, 40%, 50%, or at least 100%, exhibited by a 0.5 mm thick standalone cured film afforded therefrom.

In this respect, the film-forming agent may be defined by the mechanical properties exhibited by a standalone film made therefrom. For example, a layer-forming composition includes a major film-forming agent that is characterized by forming a standalone film having a desired $T_g$ (e.g., −30-0° C.). Alternatively, a film-forming agent may be characterized by an elongation factor (e.g., at least 5%, 10%, 20%, 30%, 40%, 50%, or at least 100%) that is exhibited by a standalone film (e.g., 0.5 mm thick) formed from a layer-forming composition comprising the same as a major ingredient.

In the context of embodiments of the present invention, the film-forming agent may be a non-coagulating film-forming agent, namely the layer-forming composition may include a non-coagulating film-forming agent and a coagulating film-forming agent that acts as a gelling agent. The non-coagulating film-forming agent contributes to the body of the layer, and confers mechanical properties to the resulting 3D object, and is used in a concentration that ranges 0-30 wt %, 0-20 wt %, 0-10 wt % or 0-5 wt % of the total weight of the composition.

According to some embodiments of the present invention, the amount of the layer-forming composition that is printed for each layer corresponds to the desired thickness of the layer, which also depends on the concentration/amount of the film-forming agent(s) in the layer-forming composition. In general, the thickness of the gelatinous layer, prior to the curing step, is not measured due to technical complexity associated with the physical measurements; however, it has been observed that shrinkage due to curing is hardly noticeable or very minimal, hence for the sake of simplicity and flow of the instant description, the thickness of the gelatinous layer is comparable to the thickness of the cured layer, and is therefore referred to herein interchangeably.

In some embodiments, the layer-forming composition is printed in an amount that ranges 10-120 pl (pico-liter) drop size. The printing of the layer-forming composition typically results in a gelatinous and/or cured layer having a thickness (i.e., height) that ranges about 10-60 μm.

According to some embodiments, thickness/height of a single layer, prior to or subsequent to the curing step, is at least 10 μm, or at least 15 μm, 20 μm, 25 μm, 30 μm, 35 μm, 40 μm, 45 μm, or at least 50 μm.

Accordingly, the height of the 3D object printed by the process provided herein is at least 30 μm, 35 μm, 40 μm, 45 μm, 5 μm, or at least 60 μm.

Gelling Agent:

According to some embodiments of the present invention, the 3D object is formed layer-wise from a layer-forming composition that includes a substance that undergoes jellification (coagulation) upon contacting a gelling initiator—this substance is referred to herein as a gelling agent.

The gelling agent can be a film-forming agent (a coagulating film-forming agent), or a resin/binder or a dispersant, or a humectant, or a co-solvent, or a surfactant, or a rheology modifier, or any other ingredient of the layer-forming composition, provided that is it sensitive to a gelling initiator, in that it causes the layer-forming composition to congeal upon contacting the gelling initiator. Without being bound by any particular theory, it is noted that the gelling agent losses its solubility in the carrier of the ink composition (the gelling agent is rendered insoluble in the carrier) upon contacting the gelling initiator, at least to some extent that is sufficient to cause congelation/coagulation of the layer-forming composition.

Coagulation can be afforded, according to some embodiments, by adding to the layer-forming composition one or more alkali-soluble gelling agents (e.g., acid-sensitive or cation-sensitive or metal oxide-sensitive gelling agents), polypeptide-based gelling agents (e.g., acid-sensitive gelling agents) and polysaccharide-based gelling agents (e.g., divalent metal cation-sensitive gelling agents), or a combination thereof. According to some embodiments of the present invention, the gelling agent is an alkali-soluble gelling agent or an acid-sensitive gelling agent, in which case the pH of the layer-forming composition is neutral (pH=7) or higher, or the pH ranges 7-10, 8-9 or 8-8.5.

In some embodiments, the gelling agent is an alkali-soluble gelling agent, which can be associated with dispersing a pigment, an alkali-soluble gelling agent that is not associated with dispersing a pigment, or a combination thereof. For example, a surfactant, a dispersing agent or hydrophilic moiety can be alkali-soluble gelling agent that is sensitive to a decrease in pH, such as effected in the presence of an acid, whereupon contacting an acid, the layer-firming composition comprising the same to coagulates (undergo sharp increase in viscosity) to form a gelatinous layer.

According to some embodiments of the present invention, the total amount of the gelling agent in the layer-forming composition presented herein is determined experimentally to be sufficient to jellify the layer. According to some embodiments, the amount/concentration of the gelling agent in the layer-forming composition ranges 0.1-30, or 1-30, or 2-20, or 5-20 wt % of the total weight of the composition. Alternatively, the concentration of said gelling agent in the layer-forming composition is greater than about 1% of the total mass of the composition, or at least 0.1%, 0.5%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, or 30%.

In the context of the present invention, a gelling agent that is sensitive to an acid such that contacting an acid causes coagulation of the layer-forming composition, is also referred to as an alkali-soluble gelling agent. According to embodiments of the present invention, alkali-soluble gelling agents include alkali-soluble dispersants, alkali-soluble surfactants, alkali-soluble polymers, alkali-soluble resins, alkali-soluble film-forming agents and alkali-soluble binders.

According to some embodiments, the alkali-soluble agent is an alkali-soluble polymer, such as, for example, an alkali-soluble acrylic polymer or alkali-soluble co-acrylic polymer such as poly(styrene/acrylic acid) polymer. It is noted herein, without being bound by any particular theory, that alkali-soluble acrylic or co-acrylic polymers are soluble in alkaline conditions under-which the carboxylic groups in the polymer are charged; whereupon acidification of the aqueous medium containing the alkali-soluble polymer, the charged groups are neutralized, leading to loss of solubility in aqueous media. In some embodiments, the alkali-soluble gelling agent is selected from the group consisting of an emulsified/dispersed a polyacrylate, a polyurethane, a polyether, a polyester, a polyvinylchloride, a polyvinyl acetate, a polyvinyl butyral, an aminosilicon polymer, a polybutadiene, a polyvinyl alcohol, a polyvinyl acetate, a polyimine and any salts thereof, co-polymer and/or combination thereof. Commercially available alkali-soluble polymers include Joncryl 586, Joncryl 678, Joncryl 96, Joncryl 296 and Joncryl 538.

Alkali-soluble (acid-sensitive) surfactants, suitable for use in the context of some embodiments of the present invention, include cationic surfactants. Exemplary cationic surfactant include, without limitation, commercially available surfactants such as BYK's Disperbyk® family, BYK 3XX family, Air products Surfynol®&Dynol® family, BASF Plurafac® and Plurafac® family.

According to some embodiments of the present invention, the pH of the layer-forming composition is maintained above neutral pH, namely the pH of the layer-forming composition is higher than 7, higher than 7.5, higher than 8, higher than 8.5, higher than 9, higher than 9.5, higher than 10, higher than 10.5, or higher than 11. The pH of the layer-forming composition can be set by the amount of all the alkali species therein, and can be further maintained at a desired level by use of an alkali pH-adjusting agent, such as a base and/or a buffer. Typically, the pH can be set to alkali levels by use of organic amines and/or ammonium hydroxide.

In some embodiments the gelling agent is sensitive to the presence of a divalent or a multivalent ion. For example, soluble salts of alginic acid (e.g., sodium alginate) are sensitive to the presence of calcium ions ($Ca^{2+}$; acting as a gelling initiator), and form calcium alginate gel upon contact.

Other gelling agents include alginic acid, sodium alginate, potassium alginate, ammonium alginate, calcium alginate, and other polysaccharides from brown algae; agar, and other polysaccharides obtained from red algae; carrageenan, and other polysaccharides obtained from red seaweeds; locust bean gum, and other gum polysaccharides obtained from carob seeds; pectin, and other polysaccharide obtained from fruits; gelatin from plant or animal source, and the likes non-toxic gelling agents.

Colorant:

The layer-forming composition may include a colorant (a coloring agent). Preferably, the layer-forming composition includes a pigment, which is essentially a plurality of fine insoluble particles that are kept suspended/dispersed in the composition, and after curing are trapped in the cured film/layer, namely are held on the surface of a substrate by an adhesive, resin or binding agent.

In some embodiments, the colorant is a dye, or a combination of a dye and a pigment.

The most prevalent reason pigments have replaced dyes for many inkjet applications is lightfastness, also known as UV fade resistance. Dyes can develop strong colors but the saturation of these colors can shift as the dye migrates with time and are prone to oxidative deterioration and fading under sunlight through UV exposure. Print permanence is an important consideration for the retention of records and the increasing use of pigment colorant has helped inkjet compete with electrophotography in this respect. In the context of embodiments of the present invention, pigments also play a role in providing the body and texture of the layer constituting the 3D object, as discussed herein. As pigments can be selected or combined to have/produce any color and to be opaque or translucent, the use of pigments in the context of the present invention is advantageous. However, the invention is not limited to layer-forming compositions that include pigment, as in some embodiments dyes may also play a role in forming and coloring the final 3D object.

In the context of some embodiments of the present invention, the 3D object is formed from several layer-forming compositions, each comprising a different pigment or none, which are used similarly as inkjet inks are used to form 2D images. In general, each layer of the 3D object can be regarded as a 2D image, whereas the object's appearance and texture is derived from the combination of these layers.

When formulating a layer-forming composition, one may select the colorants in the composition according to their light-interaction properties, such as transparency/opaqueness/turbidity, refraction, reflectance, absorbance, luminescence, phosphorescence, fluorescence, and the likes. For example, pigments can be selected to be opaque or translucent, resulting in opaque or translucent layers, respectively.

In addition, layers comprising metallic ink pigments combined with translucent layers may be used to provide additional special light-reflecting effects, as these are discussed hereinbelow.

According to some embodiments of the present invention, the concentration of an opaque pigment in the layer-forming composition ranges 1-40 wt %, or 2-30 wt % of the total weight of the composition.

According to some embodiments of the present invention, the concentration of a translucent pigment in the layer-forming composition ranges 2-30 wt %, or 2-10 wt % of the total weight of the composition.

Jellification Composition:

According to some embodiments of the present invention, the layer-forming composition undergoes jellification, which is essential for forming a 3D object according to embodiments of the present invention. The process and compositions provided herein are based on the capacity of the layer-forming composition to undergo instant jellification once jetted on the surface or previous layer of the immerging uncured 3D object, which is effected by contacting the layer-forming composition with a jellification composition comprising a gelling initiator, typically in an aqueous carrier (water as a major or only solvent). The instant jellification of any given layer is critical for depositing the next layer by inkjet printing on top of the layer, as it allows to skip a curing/hardening step between each layer deposition. This instant jellification allows to omit and generally avoid any intermediate step between inkjet print passes, which is equivalent to a layer deposition in other additive 3D printing processes, with an added advantage that the layers fuse to one-another vertically (top to bottom), leaving no visible mark or notable sign of stratification in the resulting 3D object if all layers are printed using the same layer-forming composition, before curing and/or after.

The selection of a gelling initiator depends on the chemistry of the gelling agent, and more specifically, it depends on the property that the gelling agent is sensitive to. For example, in embodiments where the gelling agent is pH-sensitive, the corresponding suitable gelling initiator is an acid. In some embodiments, the gelling agent coagulates upon contacting a divalent cation, and the corresponding suitable gelling initiator is a source of $Ca^{2+}$ ions.

The concentration of the gelling initiator in the jellification composition also depends on the type and sensitivity of the gelling agent, and can be determined experimentally once and be applied in all composition that include the same gelling agent and initiator. Typically, the concentration of the gelling initiator ranges 0.1-20 wt %, 1-20 wt %, 2-15 wt %, or 1-10 wt % of the total weight of the composition.

According to some preferred embodiments, the gelling agent is pH/acid-sensitive, and the gelling initiator is an acid, or a source of $H_3O^+$ ($H^+$) ions. More preferably, the gelling initiator is a transitory acid. Acids which may be neutralized by heat are jointly referred to herein as transitory acids. Hence, the phrase “transitory acid”, as used herein, refers to an acid which can be removed by the virtue of being volatile, decomposable, or intra/cross-reactive to form essentially neutral species.

While evaporation is one mechanism by which heat can reduce the presence of a volatile acid, such as in the case of acetic acid and other organic acids, heat can also reduce acidity in other mechanisms. Some acid compounds may exhibit pH variability over a range of physical conditions, such as temperature. For example, some organic acid compounds may undergo a chemical reaction, such as condensations, upon applying heat to the composition. This chemical reaction ultimately leads to loss of the acidic property and an elevation and neutralization of the pH in the finished product after curing, which typically involves heating.

It is noted herein that in general alpha-hydroxy acids are suitable as a transitory acid according to some embodiments of the present invention.

For example, lactic acid may be used to bring the pH of an aqueous solution to about 2-3 (pKa of 3.8 at 25° C. in water), but when heated above 100° C. in dehydrating conditions, lactic acid molecules react with one-another to afford the neutral and stable lactone specie know as lactide, which is the cyclic di-ester of lactic acid. Lactide may undergo further transformation and participate in the polymerization reaction on the substrate, as lactide is known to lead to the formation of PLA, poly-lactic acid polymers and co-polymers.

Another example for such a transitory acid is glycolic acid, which forms the cyclic and neutral lactone 1,4-dioxane-2,5-dione.

Transitoriness is required when it is desirable to have little or no traces of an acid in the final product. Therefore acid traces should be reduced before or during the curing step of the process (effected typically at 90-180° C., or 140-160° C.), and can no longer damage the substrate. On the other hand, the fumes of too-volatile acid will seep into the orifices, at print off-time, reacting with the other parts of the ink composition, causing immediate printhead blockage, and in longer time terms will cause corrosion of sensitive elements of the printing machine and the environment. Another factor is the workers health which may be adversely effected by highly volatile acid. In addition, some volatile acids cause noxious or unpleasant odor even if minute reminiscence thereof is left in the finished product. Some volatile acids leave a distinct and mostly unpleasant odor, and therefore should be disfavored as noxious odor may affect the work place as well as cause malodor of the product at the end-user side. Hence, an odorless volatile or otherwise transitory organic acid should be selected when possible.

Exemplary transitory organic acids which can provide all the above advantages with minimal disadvantages include, but are not limited to, lactic acid and glycolic acid.

Hence according to some embodiments, the acid is glycolic acid or lactic acid. The acid may be buffered by a weak amine such as tris(hydroxymethyl aminomethane), also referred to as Tris or THAM.

According to some embodiments, an acidic jellification composition is characterized by a low pH, or a pH that ranges 3-6, 4-6, or 5-6.5. In some embodiments, the pH of the jellification composition is buffered by a suitable salt or weak base, such as ammonia/ammonium base or another volatile amine, to ensure full extraction of any traces of acid or base in the printed image.

According to some embodiments of the present invention, the process of forming a 3D object on certain substrates may differ from one substrate to another, particularly when the substrate is absorptive with respect to a liquid composition. For example, when forming the 3D object on a fabric, the process starts by wetting the surface of the substrate with a jellification composition in an amount that mitigates the absorption of the layer-forming composition that follows thereafter, as well as mitigating the uneven nature of the surface of a fabric. The initial application of the jellification composition can also be effected by a device that can deliver larger amounts of the composition faster, such as a spay nozzle, as oppose to delivering the composition by an inkjet printhead. Delivering the jellification composition between deliveries of the layer-forming composition is preferably effected by an inkjet printhead, which allows a more accurate delivery in terms of position and amount.

According to some embodiments of the present invention, the amount of the jellification composition that is applied by a spray nozzle (also referred to herein a FIXA jellification composition or just "FIXA") is different than the amount applied by an inkjet printhead nozzle (also referred to herein a FOF jellification composition or just "FOF"). For example, the jellification composition is delivered by a spray nozzle in an amount the ranges 6-46 mg/cm$^2$ (about 0.04 gr/inch$^2$ to 0.3 gr/inch$^2$), while the delivery by an inkjet printhead ranges 0.15-15 mg/cm$^2$ (about 0.001 gr/inch$^2$ to 0.1 gr/inch$^2$).

The jellification composition for the initial wetting of the substrate (FIXA) may differ than the jellification composition used between layers (FOF) also in other parameters, such as viscosity and concentration of the gelling initiator. For example, see Table 1 below comparing FIXA to FOF.

TABLE 1

| Property | FIXA | FOF |
|---|---|---|
| Viscosity [cps] | 1-4 | 4-20 |
| Concentration of gelling initiator | 0.5-5 wt % | 3-15 wt % |
| Application device | Spray nozzle | Inkjet printhead |
| Amount applied | 6-46 mg/cm$^2$ | 0.15-15 mg/cm$^2$ |

3D Pattern and Object:

The result of the process provided herein is an inkjet relief (3D) print attached to the surface of a substrate. According to embodiments of the present invention, the substrate is not limited, and can be made of an absorptive material, a non-absorptive material, a flexible material, and a stretchable material.

The 3D object, according to aspects of the present invention, is a result of a 3D printing or additive manufacturing process of making three dimensional solid objects from a digital file. The creation of the herein-described printed 3D object is achieved by adding layers on top of layers, namely the additive process creates an object by laying down successive layers of material until the object is obtained. The object provided herein is also attached to the substrate by forces and interactions similar to those affixing an inkjet-printed image to the substrate.

The 3D object is a result of curing and solidifying a precursor gelatinous 3D object, afforded by layering gelatinous layers one on top of the other, while substantially maintaining the shape and size of the precursor object. Regardless of the additive process, when using the same layer-forming composition to print all layers, the final solid three-dimensional object is essentially devoid of stratification marks thereon or therein. In other words, unless the layers are printed from different layer-forming compositions (inks), according to some embodiments of the present invention, the strata cannot be differentiated from one-another visually or otherwise.

In some embodiments, the object is printed using more than one layer-forming composition (ink), whereas the different inks are visibly and/or mechanically different from one-another, such that the strata printed from different inks are discernable.

One aspect of the present invention is therefore a 3D gelatinous object, which is the result of the process and compositions provided herein, prior to the curing step. The gelatinous object has mechanical properties, such as viscosity and gel-strength that can be measured by appropriate and widely used means and protocols, as known in the art for semi-solid gelatinous substances and objects. For example, gel strength can be tested and characterized by a texture analyzer device following standard industrial protocols.

The resulting 3D object may carry over the mechanical properties of the film-forming agent(s) used in the layer-forming composition. For example, in some embodiments, the object may be stretchable to at least 10% longitudinal elongation before breaking or detaching from the surface, a property that stems from the nature of the binders/resins and other film-forming agent(s) used in the layer-forming composition.

In some embodiments, height of the 3D object is at least 10, 20, 30, 40, 50, or 60 μm. This dimension is limited by the strength of the precursor gelatinous 3D object, which is not solid and may be prone to spreading, flattening, sagging, drooping, sinking, or otherwise declining and deformation beyond certain sizes. The strength of the precursor gelatinous 3D object can be controlled to some extent by the selection and concentration of the gelling agents, the number and thickness of the layers, and the minimization of agitation exerted by the precursor prior to curing.

As in other layer-based additive processes of forming 3D objects, the process provided herein is also based on constructing the object layer-by-layer, starting from a base layer attached to the substrate, and adding two or more layers thereon. Each layer is applied as a 2D pattern, whereas the next layer that is applied on top of the previous layer may be printed following the same pattern or a different pattern. According to some embodiments of the present invention, the upper layer that is printed on top of a lower layer is equal or smaller in area than the lower layer. Hence, the 3D object, which is essentially a result of curing a gelatinous 3D object, may be cured into a shape that has vertical side walls, and/or a shape that tapers from a flat base. As can be seen in FIG. 1C, the gelatinous 3D object tapers in the non-limiting exemplary shape presented therein, which cures into the smoothly tapered shape shown in FIG. 1D, wherein in FIG. 2, the non-limiting example shows a structural feature of a 3D object having a straight vertical wall on its right side and a curving-tapering left side.

Figure 3:
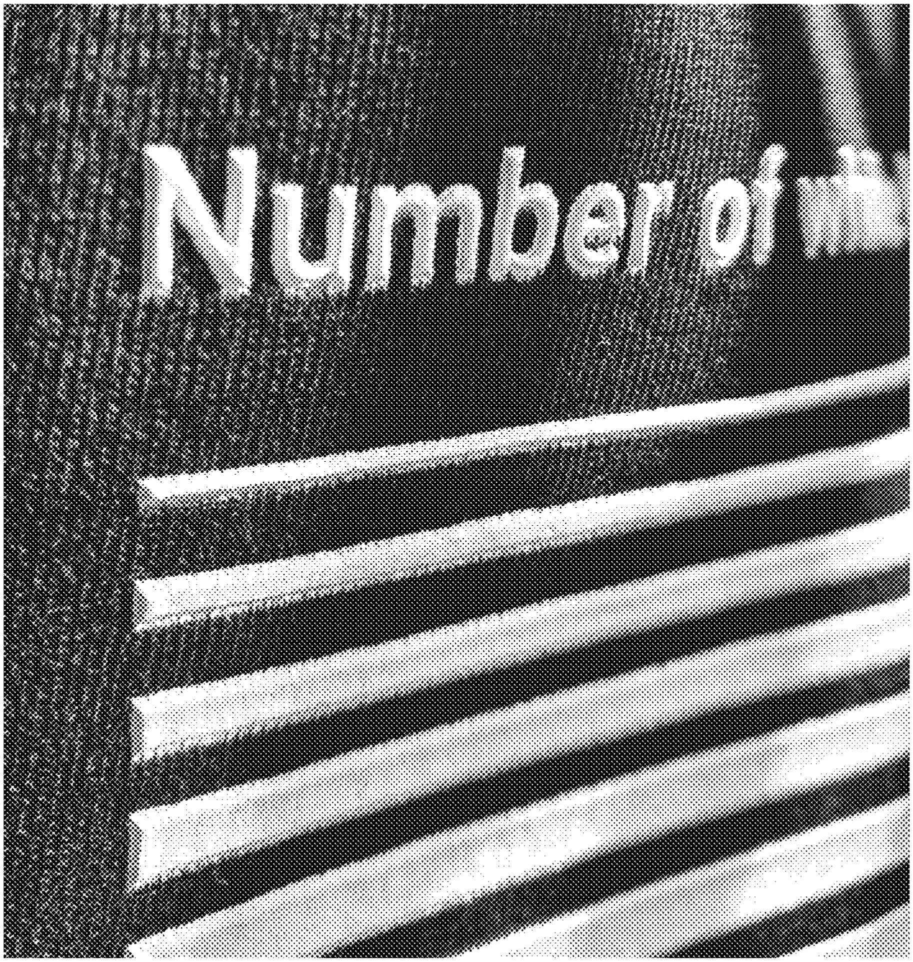
FIG. 3 is a black-and-white photograph of a fabric substrate having printed thereon several 3D objects in the form of letters and horizontal parallel lines, showing the three dimensional tapering structure in the objects, suggesting that the layers were printed by a series of layers going from a large area in the bottom layer to a smaller area in the next layer.

FIG. 3 is a black-and-white photograph of a fabric substrate having printed thereon several 3D objects in the form of letters and horizontal parallel lines, showing the three-dimensional tapering structure in the objects, suggesting that the layers were printed by a series of layers going from a large area in the bottom layer to a smaller area in the next layer.

Due to the semi-liquid/solid nature of the precursor gelatinous 3D object, it is noted herein that unlike other additive methods in 3D printing, the process provided herein is inconducive to the concept of support structures, as this term is used in the art of 3D solid printing. Briefly, 3D printing support structures are not part of the final 3D object but are used to support parts of the object during printing. This means that once printing is over, the support structures are removed.

According to another aspect of some embodiments of the present invention, there is provided a standalone 3D object, afforded by the process and compositions disclosed herein, and further afforded by separating the cured object from the substrate. In other words, the process provided herein further includes a step of removing the cured object from the substrate essentially without deforming or substantially changing the object other than the separation from the surface of the substrate.

Light-Shape Effects:

According to some embodiments of the present invention, the 3D object can be formed by a substantially transparent and colorless layer-forming composition, and/or by layer-forming compositions that include an opaque or a translucent pigment, yielding transparent, translucent, semi-transparent, or opaque colored or colorless layers in various sections of an object that includes one, some or all types of the different films. These options open the path to the formation of transparent, semi-transparent and opaque 3D objects on the substrate, and 3D objects that include structural elements of any combination thereof.

For example, a 3D object may be formed by printing a pattern in one or more base layers using an opaque, lightly colored layer-forming composition, e.g., one or more opaque white base layer(s), followed by printing additional layers using a layer-forming composition that includes translucent pigments in any combination, thereby forming a colorful 3D object having an opaque white underbase. This embodiment is particularly useful when printing a 3D object of a non-white substrate.

In another exemplary embodiment of the present invention, the object is printed from a transparent colorless or translucent layer-forming composition in the form/shape of an object having refracting-reflecting surfaces, such as in a fresnel lens, forming an object that can refract-reflect and focus light. This light refracting-reflecting object may be formed on base layer(s) that comprises a light-reflecting ingredient, mixed into the layer-forming composition, in order to enhance the light refracting-reflecting effects.

The present invention is conducive to the principles of lenticular printing. Lenticular printing is a technology in which lenticular lenses (a technology that is also used for 3D displays) are used to produce printed images with an illusion of depth, or the ability to change or move as the image is viewed from different angles. Examples of lenticular printing include flip and animation effects such as winking eyes, and modern advertising graphics that change their message depending on the viewing angle. Colloquial terms for lenticular prints include "3D postcards", "flickers", "winkies", "wiggle pictures" and "tilt cards". Also the trademarks Vari-Vue and Magic Motion are often used for lenticular pictures. In the context of embodiments of the present invention, the 3D object is a lenticular lens formed by printing an array of ridges actinbg as magnifying lenses, and designed such that when viewed from slightly different angles, different images are magnified. The most common example is the lenses used in lenticular printing, where the technology is used to give an illusion of depth, or to make images that appear to change or move as the image is viewed from different angles.

In some embodiments, the object is formed using two or more different layer-forming compositions, each forming layers characterized by different color (or lack thereof), elasticity, thickness, coverage area and the likes, such that at least some stratification marks are detectable in the object before and/or after the curing step.

It is expected that during the life of a patent maturing from this application many relevant processes for inkjet printing of 3D objects will be developed and the scope thereof is intended to include all such new technologies a priori.

As used herein the term "about" refers to +10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the phrases "substantially devoid of" and/or "essentially devoid of" in the context of a certain substance or a composition, refer to a composition that is totally devoid of this substance or includes less than about 5, 1, 0.5 or 0.1 percent of the substance by total weight or volume of the composition. Alternatively, the phrases "substantially devoid of" and/or "essentially devoid of" in the context of a process, a method, a property or a characteristic, refer to a process, a composition, a structure or an article that is devoid of a certain process/method step, or a certain property or a certain characteristic, or a process/method wherein the certain process/method step is effected at less than about 5, 1, 0.5 or 0.1 percent compared to a given standard process/method, or property or a characteristic characterized by less than about 5, 1, 0.5 or 0.1 percent of the property or characteristic, compared to a given standard.

When applied to an original property, or a desired property, or an afforded property of an object or a composition, the term "substantially maintaining", as used herein, means that the property has not change by more than 20%, 10% or more than 5% in the processed object or composition.

The term "exemplary" is used herein to mean "serving as an example, instance or illustration". Any embodiment described as "exemplary" is not necessarily to be construed as preferred or advantageous over other embodiments and/or to exclude the incorporation of features from other embodiments.

The words "optionally" or "alternatively" are used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the terms "process" and "method" refer to manners, means, techniques and procedures for accomplishing a given task including, but not limited to, those manners, means, techniques and procedures either known to, or readily developed from known manners, means, techniques and procedures by practitioners of the chemical, material, mechanical, computational and digital arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental and/or calculated support in the following examples.

EXAMPLES

Reference is now made to the following examples, which together with the above descriptions illustrate some embodiments of the invention in a non-limiting fashion.

Example 1

Materials and Methods

For proof of concept of some aspects of the present disclosure was carried out by inkjet printing a pattern of parallel lines, which was selected to demonstrate the high resolution of a 3D pattern that can be achieved by the process for forming 3D objects by inkjet, according to some embodiments of the present invention.

For some of the exemplary proof of concept experiments, an absorptive cotton fabric was chosen as a substrate to demonstrate the ability of the process to mitigate uneven and wicking surface of material.

Substrate:

A cotton garment was used for absorptive substrate. Specifically, a garment procured from PROMODORO® was used without any further treatment, namely the fabric was used as provided by the manufacturer, without washing, without smoothing, or without any pre-treatment with any surface-modifying agent or process.

A transparent PET (polyethylene terephthalate) film was used for a non-absorptive substrate.

Machine:

The substrate was mounted on a ATLAS printer (KORNIT), equipped with at least one nozzle for spraying a jellification composition formulated for large-scale spraying (termed "FIXA" herein and throughout), at least one printhead for inkjet printing a jellification composition formulated for inkjet printing conditions (termed "FOF" herein and throughout), and at least one printhead for inkjet printing a layer-forming composition comprising a white opaque pigment (titania). The printer included a curing device downstream from the printing section thereof, which was set to cure the printed pattern at a temperature of 160° C. for 8 minutes. The machine was operated at 600*600 DPI, equipped with printheads of 35 μl nominal drop size.

Figure 4C:
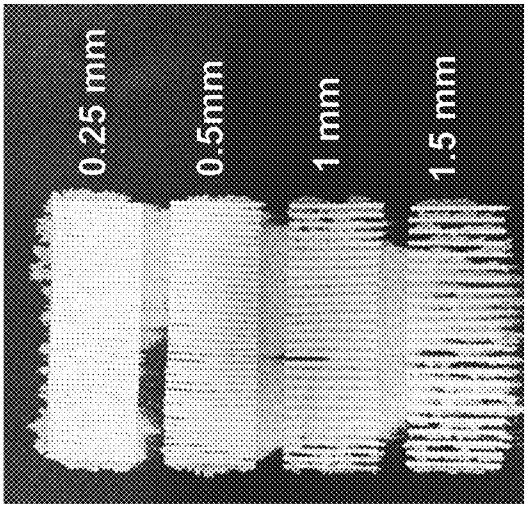
FIGS. 4A-C present photographs of patterns of parallel lines on PET film (non-absorptive substrate.
Figure 4B:
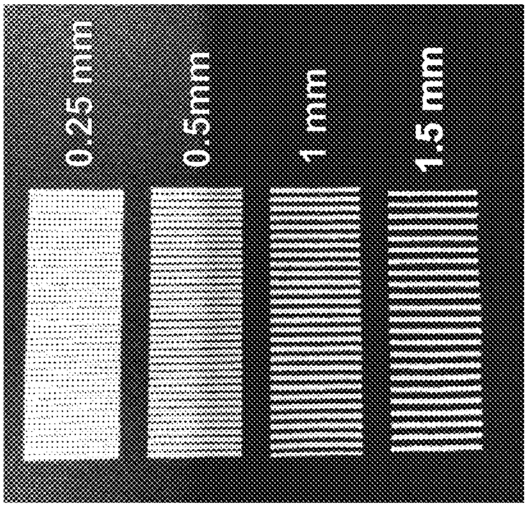
Figure 4A:
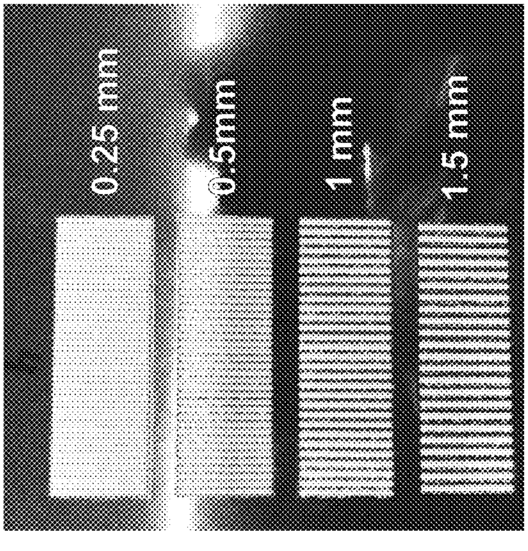

Pattern:

The pattern that was selected for this proof of concept contained two sets of parallel lines spaced 0.25 mm, 0.5 mm, 1.0 mm and 1.5 mm apart (see, FIGS. 4A-C).

FIXA Jellification Composition:

An acidic base jelling composition (a variant of a jellification composition used to mitigate the uneven and absorptive surface of the substrate) was applied by a nozzle sprayer at a rate of 0.16 μm/inch$^2$, and included:

| | |
|---|---|
| Acetic acid | 1.5 wt %; |
| BYK 348 (as wetting agent) | 0.05 wt %; and |
| Water | to Q.S. |
| pH | 4.6 |

FOF Jellification Composition:

An acidic jellification composition, used to congeal the layer-forming composition between layers, was digitally printed by an inkjet printhead at a rate of 0.005 μm/inch$^2$, and included:

| | |
|---|---|
| Lactic acid | 6 wt %; |
| Benzotriazole (acting as a corrosion inhibitor agent) | 0.3 wt %; |
| Ammonium lactate (a buffer) | 2 wt %; and |
| Water | to Q.S. |
| pH | 4.2. |

Layer-Forming Composition:

An opaque white film-forming composition, used to form the layers of the 3D object, was digitally printed by an inkjet printhead at a rate of about 4 mg/cm$^2$, and included:

| | |
|---|---|
| Acid-sensitive film-forming acrylic emulsion (Appretan E 6200, $T_g$ −20 °C) | 37 wt % |
| Titania (opaque white pigment and metal oxide) | 18 wt % |
| A mixture of propylene glycol, diethylene glycol and glycerin (as humectants) | 37 wt % |
| TEGO 750 (dispersant) | 3.2 wt % |
| BYK 024 (as an anti-foaming agent) | 0.2 wt % |
| Diethanolamine (as a buffering agent) | 0.2 wt % |
| BYK 348 (as a wetting agent/surfactant) | 0.1 wt % |
| Cymel 303 (amino resin crosslinking agent) | 3 wt % |
| Nacure 2448 (a blocked acidic catalyst) | 0.5 wt % |
| Acticide MBS (as a bacteriocide/fungicide) | 0.1 wt % |
| Deionized water | to Q.S. |
| Viscosity at 34 °C (at shear force of 4000 sec$^{-1}$) | 13 cp |
| pH | 8.5 |
| Surface tension | 34 N/m |

Analysis:

The final results, 3D objects attached on the surface of a substrate, were analyzed using several standard tests, including rub-resistance test to ensure solidification and adherence of the digitally printed and cured 3D object on the substrate (Color Fastness to Crocking/Rubbing Test, "BS EN ISO 105 X12" and "AATCC 8" using a Crockmeter).

Example 2

Results

Jellification Criticality:

The process provided herein, according to some embodiments of the present invention, was reduced to practice on absorptive and non-absorptive substrates, using the methods and materials presented hereinabove.

Specifically, FIXA was used only for the absorptive substrate, and both the opaque white layer-forming composition and FOF were printed from separate designated inkjet printhead substantially simultaneously, during the same printhead bridge movement. Four layers were printed on both substrates using the specified pattern of lines.

FIGS. 4A-C present photographs of patterns of parallel lines on PET film (non-absorptive substrate; FIG. 4A), a cotton garment (an absorptive substrate; FIG. 4B), and the same pattern and substrate as in FIG. 4B, but without printing a jelling composition with or between the layers (FIG. 4C).

As can be seen in FIGS. 4A-B, the printed while lines are seen as a relief of the pattern on both the non-absorptive and the absorptive substrates, while FIG. 4C shows a smeared pattern after printing only 3 of the intended 4 layers, demonstrating the critical role of the jelling composition.

Base and Interlayer Jellification:

The absorptive cotton garment was used to demonstrate the role of a base and interlayer jellification composition in forming a 3D object thereon.

Figure 5A:
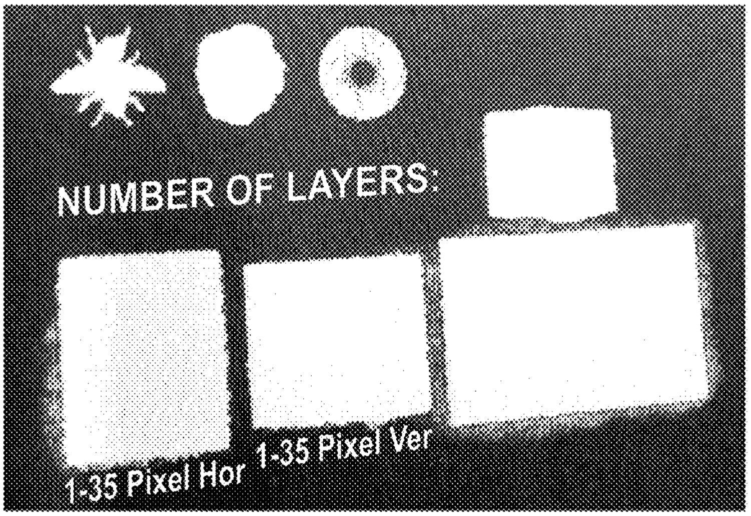
FIGS. 5A-C present photographs of an 8-layer pattern printed with an interlayer (FOF) jellification composition and without the use of a base (FIXA) jellification composition (FIG. 5A), the same 8-layer pattern printed with a base (FIXA) jellification composition and without an interlayer (FOF) jellification composition (FIG. 5B), and the same 8-layer pattern printed with a base (FIXA) jellification composition and an interlayer (FOF) jellification composition (FIG. 5C)
Figure 5B:
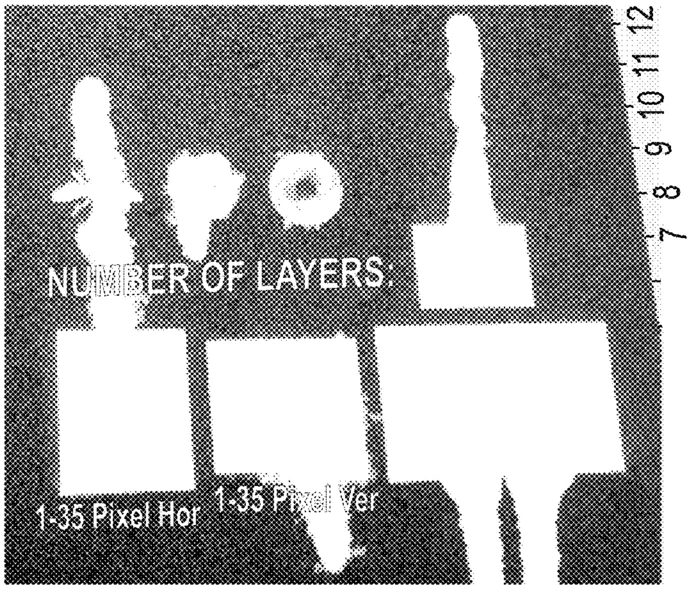
Figure 5C:
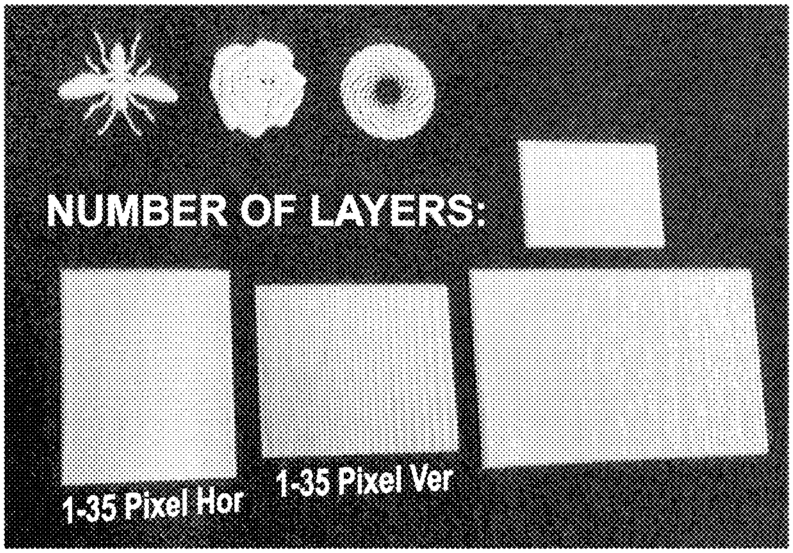

FIGS. 5A-C present photographs of an 8-layer pattern printed with an interlayer (FOF) jellification composition and without the use of a base (FIXA) jellification composition (FIG. 5A), the same 8-layer pattern printed with a base (FIXA) jellification composition and without an interlayer (FOF) jellification composition (FIG. 5B), and the same 8-layer pattern printed with a base (FIXA) jellification composition and an interlayer (FOF) jellification composition (FIG. 5C).

As can be seen in FIGS. 5A-C, both the FIXA and the FOF are critical for the formation of a high-resolution, well defined and substrate-retained 3D object by inkjet on cotton fabric, according to some embodiments of the present invention. As can be seen in FIG. 5A, without addressing the wicking and uneven surface of the cotton garment, the first layer that was printed on this substrate, constituting the first layer of the object, feathered and smudged without first spraying the surface with FIXA, whereas FIG. 5B shows what happens when no jellification composition is printed and how 8 layers of the opaque-white layer-forming composition smear and become runny without congelation. FIG. 5C provide a clear proof of concept of the invention disclosed herein, showing a collection of 3D objects inkjet printed on an absorptive substrate, including close and parallel lines in the direction and perpendicular to the direction of rapid printhead assembly (bridge; mount) movement (X/Y axes), intricate patterns (fly, rose and vortex), and alphabet/number characters.

Figure 6:
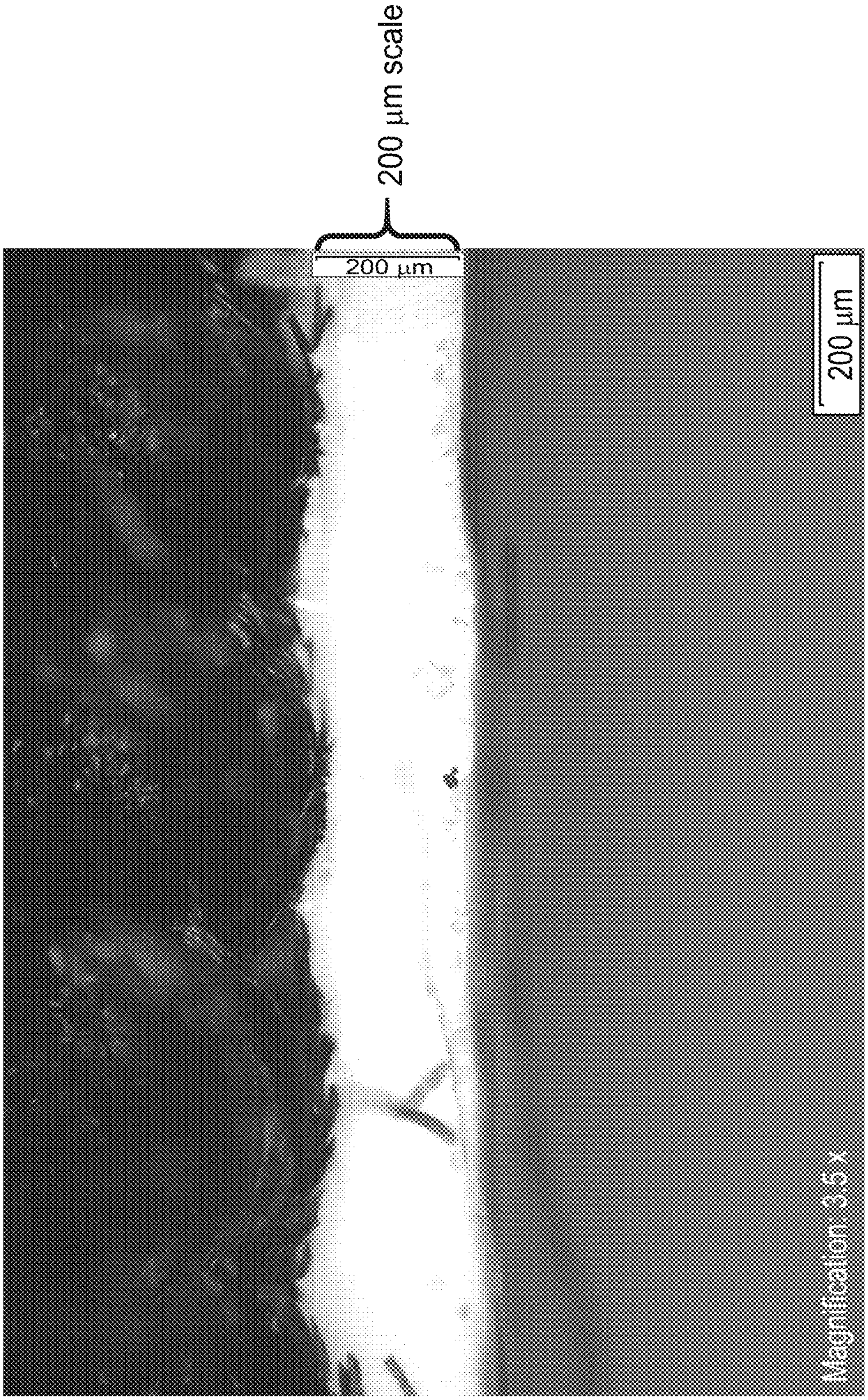
FIG. 6 presents a photograph of the cross-section of a 12-layers thick 3D object that was printed on a cotton garment, showing an average thickness of about 240 μm.

Once it had been established that effecting jellification of the layer-forming composition is critical, otherwise printing more than 2 layers would result in a liquid thick layer of ink that flows freely without ever forming a 3D object, the next was to verify what is the contribution of each layer is to the thickness of the object. In order to arrive at an easily measurable thickness, 12 layers of a simple rectangular pattern were printed on the same substrate using the same layer-forming composition as in the foregoing; the substrate and the object were cut in the center of the simple flat object and the cross-section of the object was measured. As can be seen in FIG. 6, in this experiment it was found that each layer contributes about 20 μm to the height of the object (the Z-axis).

FIG. 6 presents a photograph of the cross-section of a 12-layers thick 3D object that was printed on a cotton garment, showing an average thickness of about 240 μm.

In order to characterize the printed and cured 3D object on a cotton garment substrate, 4 layers of the layer-forming composition (opaque white) and the jellification composition (FOF) as in the foregoing, were printed after applying the base jellification composition (FIXA). Two identical prints were prepared, one was tested as will be describe below, directly after printing without curing, and the second was first cured for 8 minutes at 160° C. in a hot air oven.

The prints were tested in a rub-fastness assay using a crockmeter (Crockmaster from James Heal™), following the procedure of AATCC 8 and EN ISO 105-X12 using weights to produce a loading of 9N, then using a crocking cloth to rub the printed layers.

The results were as expected, the test probe spread the ink in the uncured sample, while on the cured layers the crockmeter test probe had almost no visible effect on the 3D object.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. A process of forming a three-dimensional object on a surface of a substrate, comprising:

(a) inkjet printing a pattern on an area of the surface using a layer-forming composition and a jellification composition, thereby forming a first gelatinous layer;

(b) repeating step (a) on said first gelatinous layer, thereby forming a second gelatinous layer on said first gelatinous layer;

(c) repeating step (b) n-times so as to form an $n^{th}$ gelatinous layer on said second gelatinous layer, thereby forming a three-dimensional gelatinous object wherein n is an integer equal to or greater than 1, and (d) curing said three-dimensional gelatinous object, thereby forming the three-dimensional object, wherein each of said layer-forming composition and said jellification composition is devoid of a UV-curable agent; and wherein said layer-forming composition is characterized by a viscosity that ranges 4-25 cps at 25° C.

2. The process of claim 1, wherein a thickness/height of each of said first, second and $n^{th}$ gelatinous layer independently is at least 10 μm.

3. The process of claim 1, wherein n is greater than 2.

4. The process of claim 1, wherein said layer-forming composition comprises a pigment.

5. The process of claim 1, wherein said layer-forming composition comprises a gelling agent that congeals at a pH of less than 7 or upon contacting a cation or upon contacting a metal oxide.

6. The process of claim 5, wherein said gelling agent is selected from the group consisting of a pH-sensitive alkali-soluble polymer selected from the group consisting of a polyacrylate, a polyurethane, a polyester, a polybutadiene, a polyvinylchloride, a polyvinyl alcohol, a polyvinyl acetate, a polyimine, and any mixture and/or copolymers thereof.

7. The process of claim 5, wherein said layer-forming composition comprises up to 30 wt % of a non-coagulating film-forming agent.

8. The process of claim 1, wherein said jellification composition comprises a gelling initiator selected from the group consisting of an acid, a divalent cation and a metal oxide.

9. The process of claim 8, wherein said gelling initiator is a transitory acid, and the pH of said jellification composition ranges 3-6.5.

10. The process of claim 1, wherein said layer-forming composition is applied before, together or after applying said jellification composition.

11. The process of claim 1, effected on an absorptive substrate, and further comprising applying a base jelling composition on the surface of the substrate, prior to Step (a).

12. The process of claim 1, wherein Step (d) is effected by heating said three-dimensional gelatinous object to a temperature ranging 90-200° C.

13. A process of forming a three-dimensional object on a surface of a substrate, comprising:

(a) inkjet printing a pattern on an area of the surface using a layer-forming composition and a jellification composition, thereby forming a first gelatinous layer;

(b) repeating step (a) on said first gelatinous layer, thereby forming a second gelatinous layer on said first gelatinous layer;

(c) repeating step (b) n-times so as to form an $n^{th}$ gelatinous layer on said second gelatinous layer, thereby forming a three-dimensional gelatinous object wherein n is an integer equal to or greater than 1, and (d) curing said three-dimensional gelatinous object, thereby forming the three-dimensional object, wherein:

each of said layer-forming composition and said jellification composition is devoid of a UV-curable agent, and said jellification composition comprises a gelling initiator, said gelling initiator is a transitory acid, and the pH of said jellification composition ranges 3-6.5.

14. A process of forming a three-dimensional object on a surface of a substrate, comprising:

(a) inkjet printing a pattern on an area of the surface using a layer-forming composition and a jellification composition, thereby forming a first gelatinous layer;

(b) repeating step (a) on said first gelatinous layer, thereby forming a second gelatinous layer on said first gelatinous layer;

(c) repeating step (b) n-times so as to form an $n^{th}$ gelatinous layer on said second gelatinous layer, thereby forming a three-dimensional gelatinous object wherein n is an integer equal to or greater than 1, and (d) curing said three-dimensional gelatinous object, thereby forming the three-dimensional object, wherein:

each of said layer-forming composition and said jellification composition is devoid of a UV-curable agent; and Step (d) is effected by heating said three-dimensional gelatinous object to a temperature ranging 90-200° C.

* * * * *